(12) United States Patent
Figgs et al.

(10) Patent No.: US 11,959,476 B2
(45) Date of Patent: Apr. 16, 2024

(54) PACKING SLEEVE REMOVAL FEATURE

(71) Applicant: SPM Oil & Gas Inc., Fort Worth, TX (US)

(72) Inventors: David T. Figgs, Fort Worth, TX (US); Justin Poehls, Glen Rose, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 17/673,428

(22) Filed: Feb. 16, 2022

(65) Prior Publication Data
US 2023/0258175 A1 Aug. 17, 2023

(51) Int. Cl.
*F04B 53/22* (2006.01)
*F04B 53/16* (2006.01)
*F16J 15/18* (2006.01)

(52) U.S. Cl.
CPC ............ *F04B 53/22* (2013.01); *F04B 53/164* (2013.01); *F16J 15/183* (2013.01)

(58) Field of Classification Search
CPC ................................ F04B 53/22; F04B 53/164
See application file for complete search history.

(56) References Cited

U.S. PATENT DOCUMENTS 3,786,729 A 1/1974 Rizzone
8,100,407 B2 1/2012 Stanton et al.

FOREIGN PATENT DOCUMENTS

| CN | 204729291 U | 10/2015 |
| CN | 205025751 U | 2/2016 |
| WO | WO 01/09535 A1 | 2/2001 |

*Primary Examiner* — Kenneth Bomberg
*Assistant Examiner* — Daniel S Collins

(57) ABSTRACT

A fluid end block for a reciprocating pump defines a fluid chamber and a packing bore. An outlet fluid passage is formed in the fluid end block in communication with the fluid chamber and includes an outlet valve. An inlet fluid passage is formed in the fluid end block in fluid communication with the fluid chamber and includes an inlet valve. A plunger is reciprocally disposed in the packing bore. Packing in the packing bore is positioned to contact the plunger and a packing sleeve is disposed between the packing and the packing bore. The packing sleeve is a hollow cylinder with inner and outer surfaces and an inner end configured to be inserted into the packing bore. The inner end includes a bevel extending between the outer surface and the inner end, the outer surface including a notch formed therein adjacent the inner end.

10 Claims, 10 Drawing Sheets

PACKING SLEEVE REMOVAL FEATURE

TECHNICAL FIELD

The present disclosure relates to pump assemblies and, in particular, packing sleeves for such pump assemblies and methods of assembly and disassembly.

BACKGROUND

In hydraulic fracturing, and other similar applications, the pumping equipment used to pump fluid media into a well is an important part of the fracturing system and process. Reciprocating pump systems have been used for decades to propel a fluid media, typically a mixture of water, sand and chemicals, for example, into a well at high pressures and flow rates. Increasing demands of pressure pumping has required such pumps to evolve by increases in size, horsepower rating, and pressure capabilities. As a result, designing pump assemblies to be reliable and easily maintained has become an increasingly important consideration.

Reciprocating pump systems typically include fluid end blocks with fluid inlet and outlet passages for the fluid media. Each of the fluid inlets and fluid outlets include a check valve to control the flow of fluid through the fluid end block. Such pump systems have a plunger that generates the substantial pumping flows at pressures required to pump the fluid media through the pump. A packing sleeve and packing is positioned in the fluid end block that defines a cylinder in which the plunger is positioned and reciprocates. Pump systems typically have both a cover assembly and a retainer for access to the inner workings of the fluid end of the pump for initial assembly and maintenance. A retaining system secures a closure at an installed position within a bore of the fluid block. The retaining system includes a retaining cover or nut for holding the closure in the bore. The retaining nut typically has external threads that are engageable with the screw threads of the bore such that the cover is rotatable relative to the housing in a tightening direction for movement of the cover into the bore toward the closure and rotatable in an opposite, loosening direction for movement of the cover out from the bore away from the closure.

The current method of removing packing sleeves for replacement involves removing the fluid end block from the pump system and transporting the fluid end from the field to a maintenance facility. In the facility, the sleeve is machined out or machined so it can be engaged, pulled out and replaced. The time and expense involved to perform replacement of the fluid end sleeve(s) at a remote location from the field installment is substantial.

U.S. Pat. No. 8,100,407 discloses a pump system with a fluid block. FIG. 11 shows a cross-sectional view of a packing cartridge, with the addition of milled slots formed in the bottom of a sleeve part to facilitate prying the cartridge out of the packing bore in case it becomes wedged.

There is a need for easily performed extraction of sleeves in a fluid end of a pump assembly system. Devices and methods according to the disclosure satisfy the need.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined at least by the appended claims.

SUMMARY

In one aspect, the disclosure is a packing sleeve, including a hollow cylinder, wherein the hollow cylinder includes an inner surface, an outer surface opposite the inner surface, and an inner end including a bevel extending between the outer surface and the inner end. The inner surface includes a notch formed therein adjacent the inner end.

In another aspect, the disclosure includes a fluid end for a reciprocating pump system, including a fluid end block defining a fluid chamber and a packing bore. An outlet fluid passage is formed in the fluid end block in fluid communication with the fluid chamber, the outlet fluid passage including an outlet valve. An inlet fluid passage is formed in the fluid end block in fluid communication with the fluid chamber, the inlet fluid passage including an inlet valve. A plunger is reciprocally disposed in the packing bore of the fluid chamber to generate fluid pressure therewithin. Packing is disposed in the packing bore positioned to contact the plunger and a packing sleeve is disposed between the packing and the packing bore, the packing sleeve configured as a hollow cylinder, wherein the hollow cylinder includes an inner surface, an outer surface opposite the inner surface, and an inner end configured to be inserted into the packing bore, the inner end including a bevel extending between the outer surface and the inner end, the inner surface including a notch formed therein adjacent the inner end.

Yet another aspect of the disclosure is a method of removing a packing sleeve from a packing bore of a fluid end block of reciprocating pump system, the method including positioning a tool inside the packing sleeve; expanding the tool inside the packing sleeve; engaging, with the tool, one or more notch of the packing sleeve; and applying, via an actuator, a load to the tool and to the notch in a direction to force the packing sleeve out of the packing bore and out of the fluid end block.

DETAILED DESCRIPTION

Figure 1:
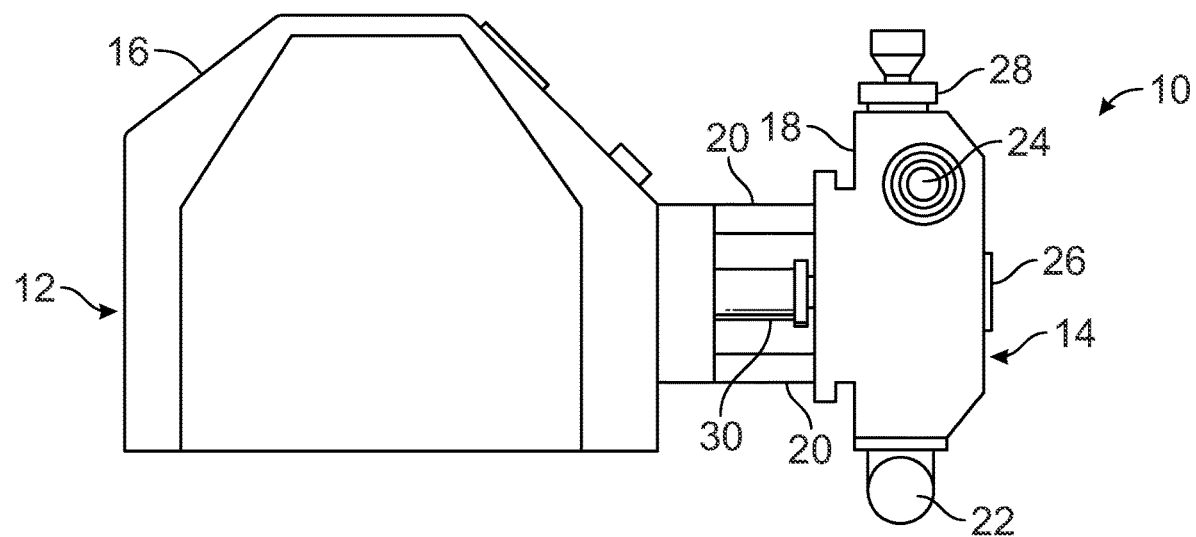
FIG. 1 is an elevation view of a reciprocating pump system according to an exemplary embodiment, the reciprocating pump system including a fluid end.

Now referring to the drawings, wherein like elements refer to like reference numbers, there is illustrated in FIG. 1 an exemplary embodiment of a reciprocating pump system (generally referred to by the reference numeral 10) including a power end portion 12 and a fluid end portion 14 operably coupled thereto. The power end portion 12 includes a housing 16 in which a crankshaft (not shown) is disposed, as is known, the crankshaft being operably coupled to an engine or motor (not shown), as is known, which is configured to drive the crankshaft. The fluid end portion 14 includes a fluid end block 18, which is connected to the housing 16 via a plurality of stay rods 20. The fluid end block 18 includes a fluid inlet passage 22 and a fluid outlet passage 24, which are spaced in a parallel relation. A plurality of fluid end retainer assemblies 26, one of which is shown in FIG. 1, is connected to the fluid end block 18 opposite the stay rods 20. A plurality of cover assemblies 28, one of which is shown in FIG. 1, is connected to the fluid end block 18 opposite the fluid inlet passage 22. A plunger rod assembly 30 extends out of the housing 16 and into the fluid end block 18. Other configurations of a reciprocating pump system 10 are contemplated.

Figure 2:
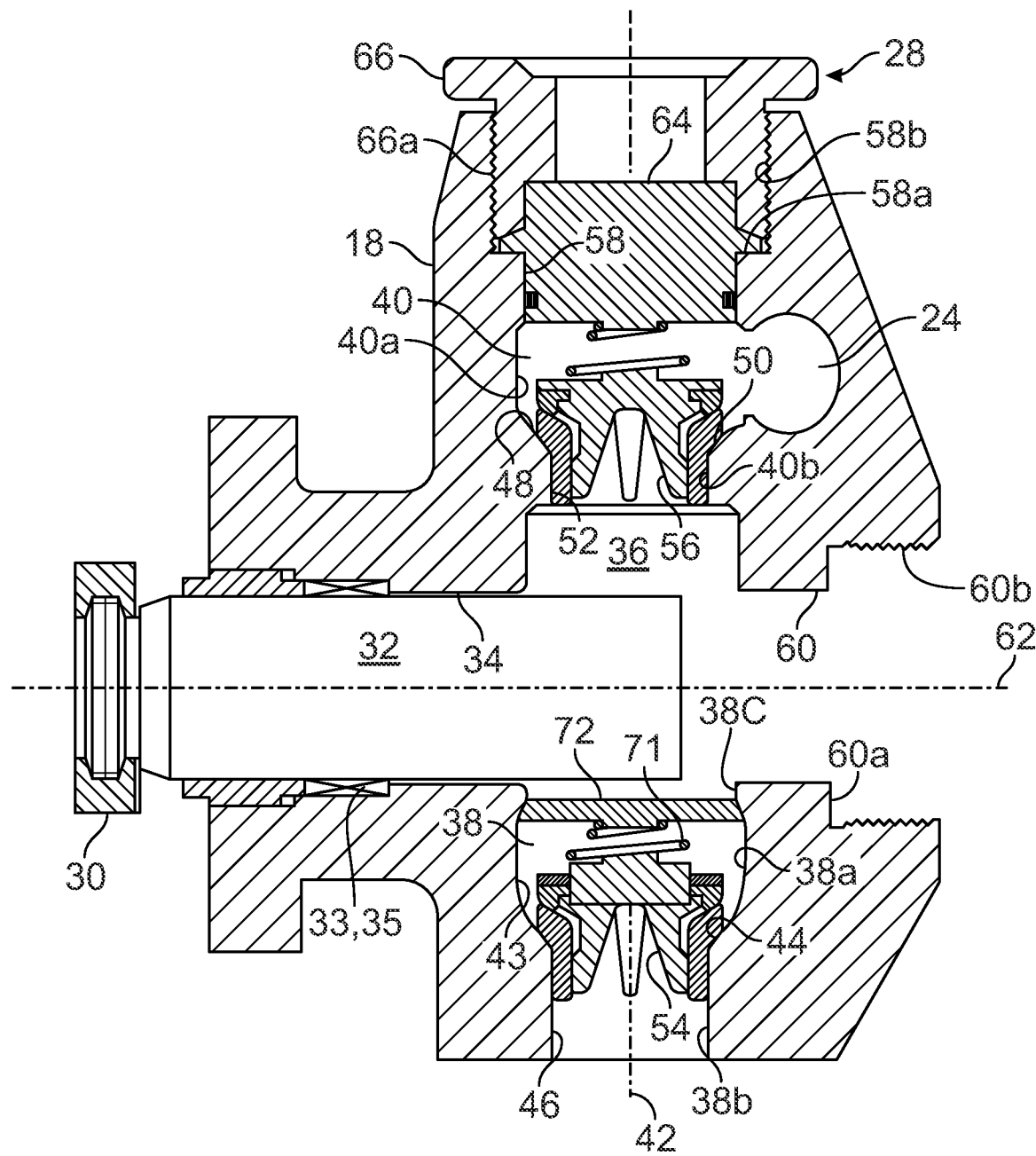
FIG. 2 is a section view of the fluid end of FIG. 1 according to an exemplary embodiment, the fluid end including a fluid end block.

In embodiments, as illustrated in FIG. 2 with continuing reference to FIG. 1, the plunger rod assembly 30 includes a plunger 32, which extends through a packing bore 34 formed in the fluid end block 18, and into a fluid chamber 36 formed in the fluid end block 18. The plunger 32 is reciprocally disposed in the fluid chamber 36 to displace the fluid therewithin, thus creating flow. In embodiments, a plurality of parallel-spaced bores may be formed in the fluid end block 18, with one of the bores being the packing bore 34, a plurality of fluid chambers may be formed in the fluid end block 18, with one of the fluid chambers being the fluid chamber 36, and a plurality of parallel-spaced plungers may extend through respective ones of the bores and into respective ones of the fluid chambers, with one of the plungers being the plunger 32. The packing bore 34 includes a general indication of a packing sleeve 33 and packing 35 positioned in the bore. Packing 35 is also known as gland packing. Gland packing is different than a mechanical seal and is preferred in the illustrated pumping environment. FIG. 2 shows only the position of the packing sleeve 33 and packing 35. Details of the packing sleeve 33 and packing 35 are shown in the following figures.

The fluid end block 18 includes inlet and outlet fluid passages 38 and 40 formed therein, which are generally coaxial along a fluid passage axis 42. Under conditions to be described below, fluid flows from the inlet fluid passage 38 toward the outlet fluid passage 40 along the fluid passage axis 42. The fluid inlet passage 22 is in fluid communication with the fluid chamber 36 via the inlet fluid passage 38. The fluid chamber 36 is in fluid communication with the fluid outlet passage 24 via the outlet fluid passage 40.

The inlet fluid passage 38 may include an enlarged-diameter portion 38a and a reduced-diameter portion 38b extending downward therefrom (oriented as in the figure), which direction may also be considered the upstream direction. Downstream from the enlarged-diameter portion is a narrow neck 38c.

The enlarged diameter portion 38a defines a tapered internal shoulder 43 and thus a frusto-conical surface 44 of the fluid end block 18. The reduced-diameter portion 38b defines an inside surface 46 of the fluid end block 18. Similarly, the outlet fluid passage 40 includes an enlarged-diameter portion 40a and a reduced-diameter portion 40b extending downward therefrom. The enlarged-diameter portion 40a defines a tapered internal shoulder 48 and thus a frusto-conical surface 50 of the fluid end block 18. The reduced-diameter portion 40b defines an inside surface 52 of the fluid end block 18. The frusto-conical surfaces 44, 50 form valve seats for respective inlet and outlet valves 54, 56.

An inlet valve 54 is disposed in the inlet fluid passage 38 adjacent the frusto-conical surface 44 and the inside surface 46. Similarly, an outlet valve 56 is disposed in the outlet fluid passage 40 adjacent at least the frusto-conical surface 50 and the inside surface 52. In an exemplary embodiment, each of valves 54 and 56 is a spring-loaded valve that is actuated by a predetermined differential pressure thereacross.

A counterbore 58 is formed in the fluid end block 18, and is generally coaxial with the outlet fluid passage 40 along the fluid passage axis 42. In embodiments, the fluid end block 18 may include a plurality of parallel-spaced counterbores, one of which may be the counterbore 58, with the quantity of counterbores equaling the quantity of plunger throws included in the pump system 10. The cover assembly 28 shown in FIGS. 1 and 2 includes at least a plug 64 and a fastener 66. In embodiments, the cover assembly 28 may be disconnected from the fluid end block 18 to provide access to, for example, the counterbore 58, the fluid chamber 36, the plunger 32, the outlet fluid passage 40 or the outlet valve 56. In embodiments, the pump system 10 may include a plurality of plugs, one of which is the plug 64, and a plurality of fasteners, one of which is the fastener 66, with the respective quantities of plugs and fasteners equaling the quantity of plunger throws included in the pump system 10.

A counterbore 60 is formed in the fluid end block 18, and is generally coaxial with the packing bore 34 along an axis 62. The counterbore 60 defines an internal shoulder 60a and includes a retainer channel 60b in-cut into the counterbore and adjacent and outboard the internal shoulder 60a. In embodiments, the retainer channel 60b includes a channel shoulder 60c, which faces inwardly toward the internal shoulder 60 and is normal to the axis 62. Opposite the channel shoulder 60c is an arcuate face 60d.

In embodiments, the fluid end block 18 may include a plurality of parallel-spaced counterbores, one of which may be the counterbore 60, with the quantity of counterbores equaling the quantity of plunger throws included in the pump system 10. The counterbore 60 is sized and shaped to receive a retainer assembly 26 (see, e.g., FIG. 3). The retainer assembly 26 may be disconnected from the fluid end block 18 to provide access to, for example, any of the counterbore 60, the fluid chamber 36, the plunger 32, the inlet fluid passage 38, or the inlet valve 54. The retainer assembly 26 may then be reconnected to the fluid end block. In several exemplary embodiments, the pump system 10 may include a plurality of plugs, one of which is the plug 68, shown in FIG. 3, for example, with the respective quantities of plugs and retainer assemblies 26 equaling the quantity of plunger throws included in the pump system 10.

Focusing now on the inlet fluid passage 38, a biasing member 71 is positioned within the inlet fluid passage 38. The biasing member 71 may be a coil spring. In one embodiment the biasing member 71 is a conical coil spring. The biasing member 71 may be retained in place by a spring stop 72 as is known. The spring stop 72 is held within the enlarged-diameter portion 38a by the narrow neck 38c. When installed as shown in FIG. 2, the biasing member 71 exerts a selected biasing force on the inlet valve 54 that holds the inlet valve against a seat positioned on the frusto-conical surface 44 to create a closed or sealed condition. When a pressure differential on the inlet valve 54 exceeds the closing force generated by the biasing member 71, the inlet valve opens and permits fluid media to enter the fluid chamber 36.

Figure 3:
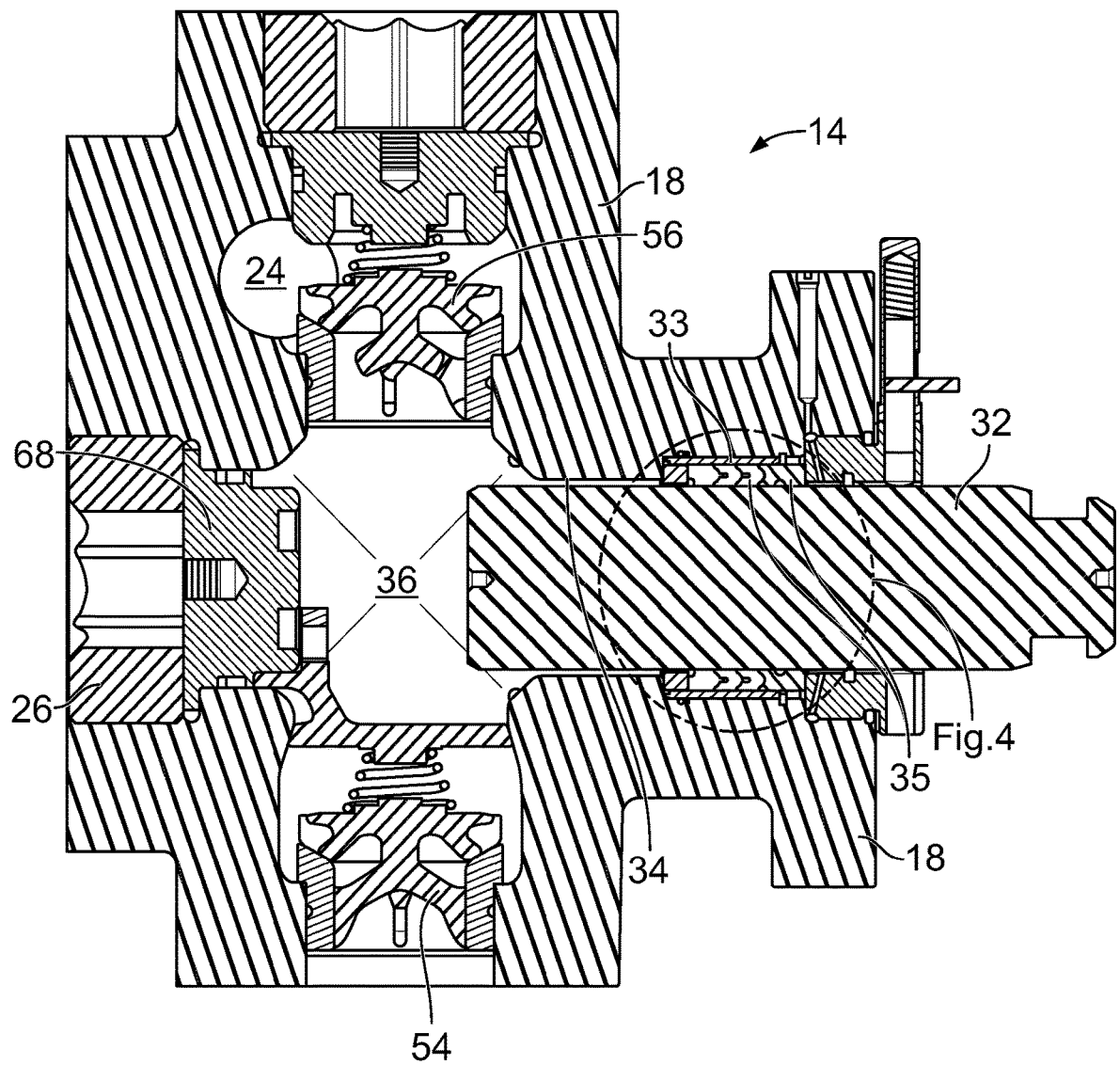
FIG. 3 is a section view of a fluid end according to embodiments and a packing sleeve positioned therein.
Figure 4A:
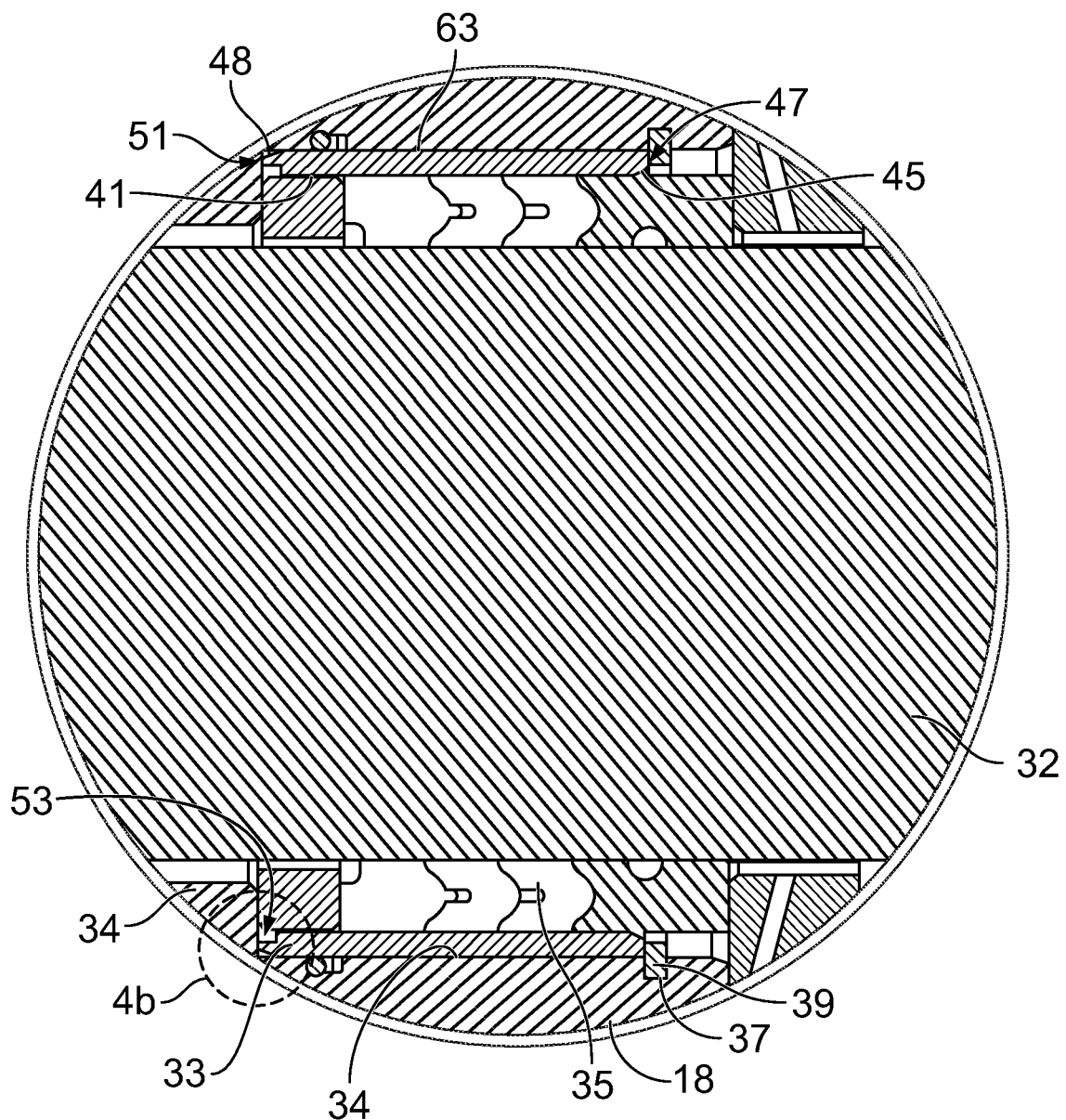
FIG. 4a is a close up view of the packing sleeve of FIG. 3.
Figure 4B:
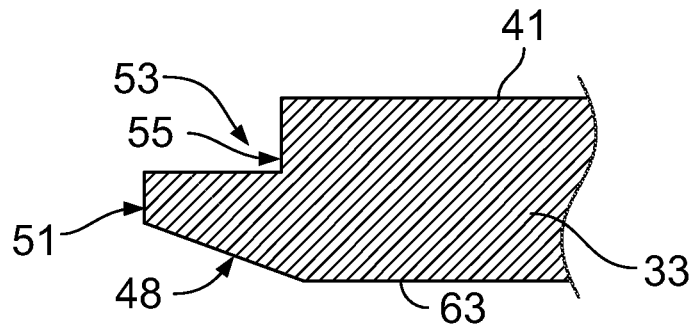
FIG. 4b is a close up view of FIG. 4a, which is a part of the packing sleeve.

Turning to FIGS. 3, 4a and 4b, an embodiment of a fluid end portion 14 includes a fluid end block 18. Packing bore 34 includes a sleeve 33 positioned therein. The sleeve 33 is cylindrical, hollow, and may be a press fit to the packing bore 34. The sleeve 33 may be of a single-piece construction of stainless steel or any suitable material. Packing 35, which is a conventional arrangement of standard packing materials, is positioned radially within the sleeve 33 and configured to contact the plunger 32 to provide a specified amount of sealing performance and allows the plunger to reciprocate therewithin.

For orientation, the arrangement of the fluid end portion 14 in FIG. 3 is a mirror image relative to FIG. 2. For example, while the outlet valve 56 and fluid outlet passage 24 is above the inlet valve 54, as shown in FIGS. 2 and 3, the plunger 32 enters the fluid end block 18 from the right side of the drawing in FIG. 3. Opposite the plunger 32 and across the pressure chamber 36 is a plug 68 and retainer nut 26. Referring to FIG. 4a, the sleeve 33 is disposed in contact with the packing bore 34. Outboard of the sleeve 33 the packing bore 34 may have an annular groove 37 which is configured to receive a ring 39. The ring 39 is sized and shaped to retain the sleeve 33 in the packing bore 34 once the sleeve is positioned in an installed condition in the packing bore 34 of the fluid end block 18.

The sleeve 33, in embodiments and shown in detail in FIG. 4b, has an inner surface 41 and an outer surface 63. A first bevel 45 is formed at a junction of the inner surface 41 at an outer end 47 thereof to ease axial insertion of packing 35 after the sleeve 33 is positioned. A second bevel 49 is formed at a junction of the outer surface 63 at an inner end 51 thereof to ease axial installation of the sleeve 33 into the packing bore 34. A notch 53 is formed at the inner end 51 in the inner surface 41 that provides an inwardly facing radial face 55.

Figure 5:
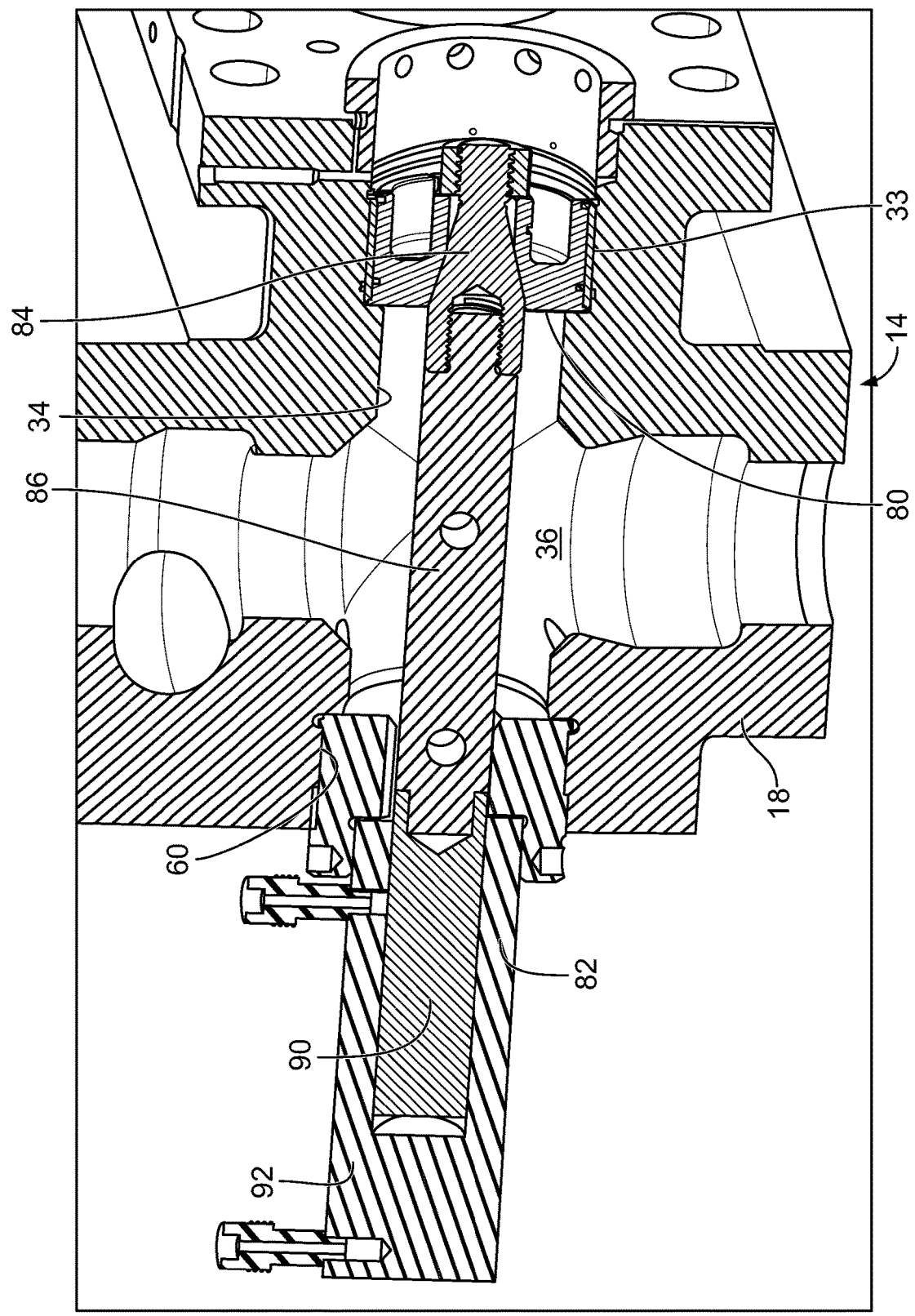
FIG. 5 is a perspective section view of a fluid end with an extraction tool positioned to extract the packing sleeve.
Figure 6:
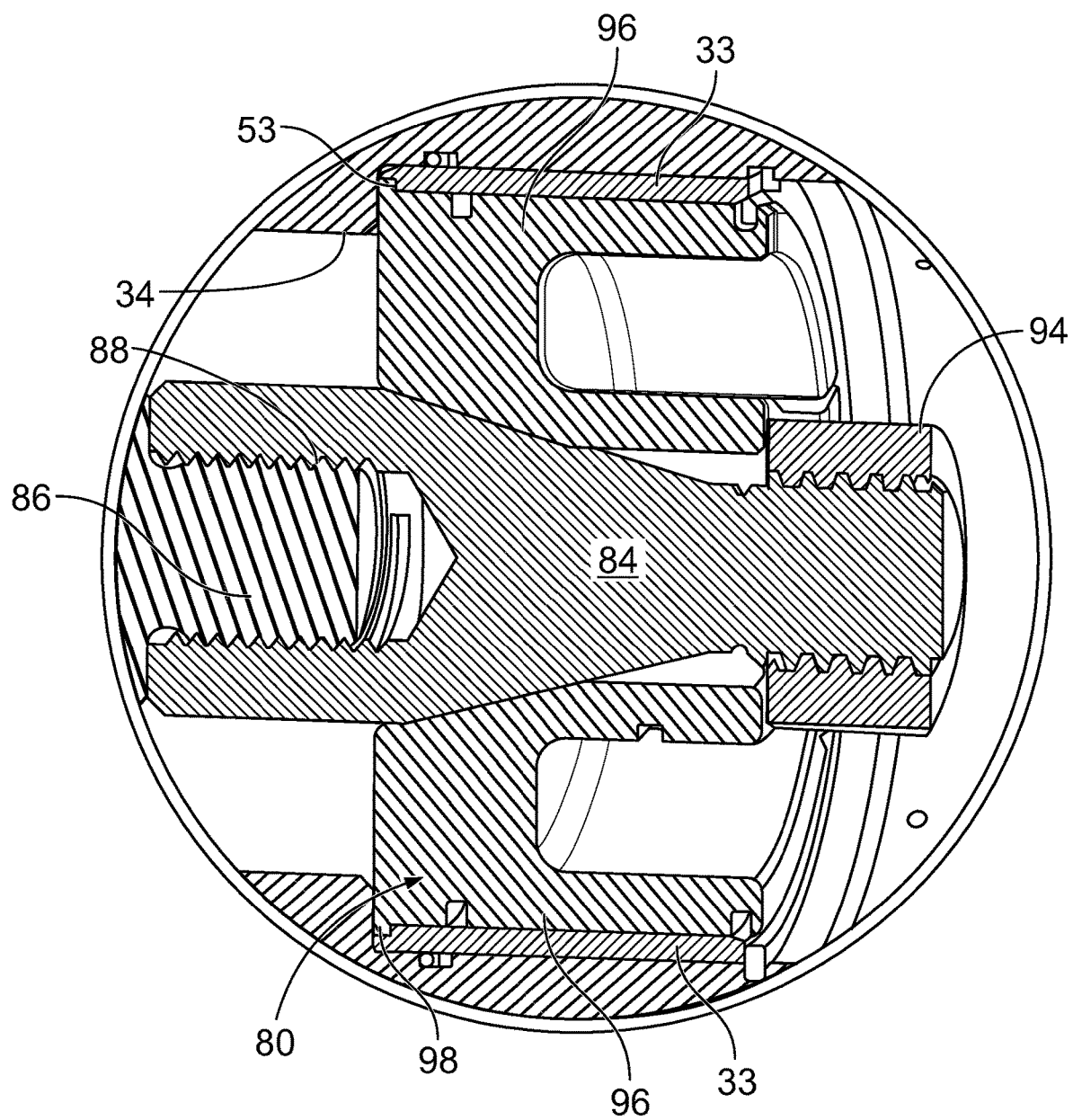
FIG. 6 is a close up section view of FIG. 5 showing the engagement of the extraction tool and packing sleeve according to embodiments.

FIG. 5 and FIG. 6 show a tool head 80 engaged with the notch 53 of the sleeve 33 and an actuator assembly 82 for moving the tool head in and out of the packing bore 34 of the fluid end portion 14. The tool head 80 may be inserted into the fluid end portion 14 after removal of the plunger 32, plug 68, and nut 26 (FIG. 3). The tool head 80 is positioned to remove the sleeve 33 by inserting the tool head into the fluid end portion 14 through the bore 60, through the fluid chamber 36, and into position adjacent and inside the sleeve 33.

The tool head 80 is configured to expand radially to engage the notch 53 by way of a cone-shaped mandrel 84 positioned inside the tool head, in the fashion of an expandable collet. The mandrel 84 may be attached to a rod 86 by way of a threaded connection 88. The rod 86 is attached to a piston 90 of an actuator 92, which may include a hydraulic or pneumatic cylinder. Alternatively, the actuator 92 may be operated mechanically or electrically.

The mandrel 84 includes a fastener 94 which captures a plurality of separate and expandable tool parts 96 on the mandrel. When tightened on the mandrel 84, the fastener 94 forces the tool parts 96 onto the cone of the mandrel which causes the tool parts to be spread apart radially. Each of the tool parts includes a radially outwardly extending catch 98 that is sized and shaped to engage the notch 53. It will be understood that the notch 53 may be a single notch, groove, face, holes, or multiple features, or other any structural feature capable of being engaged. The catch 98 may be a single structural feature or multiple features that are sized and shaped to engage the notch or notches. Some examples of notches and catches are shown and discussed in connection with FIGS. 7-12.

Figure 7:
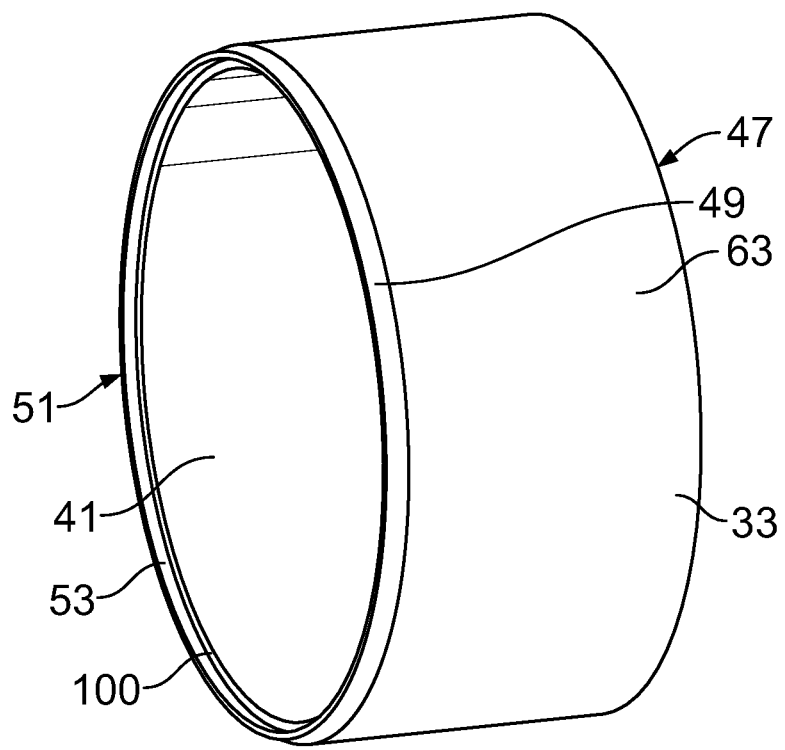
FIGS. 7 and 8 are respectively a perspective view of an embodiment of a packing sleeve and a collet tool therefor.

FIG. 7 is an example of a sleeve 33 according to embodiments. The sleeve 33 is generally cylindrical and hollow and includes an outer surface 63 with a bevel 49 formed at the inner end 51. The sleeve 33 includes an inner surface 41 that includes a notch 53 at the inner end 51. The notch 53 extends the entire distance about the inner periphery of the inner surface 41 at the inner end 51 and includes a face 100 that is normal to axis 62 when installed in the bore 60 of the fluid end block 18 (FIG. 2).

Figure 8:
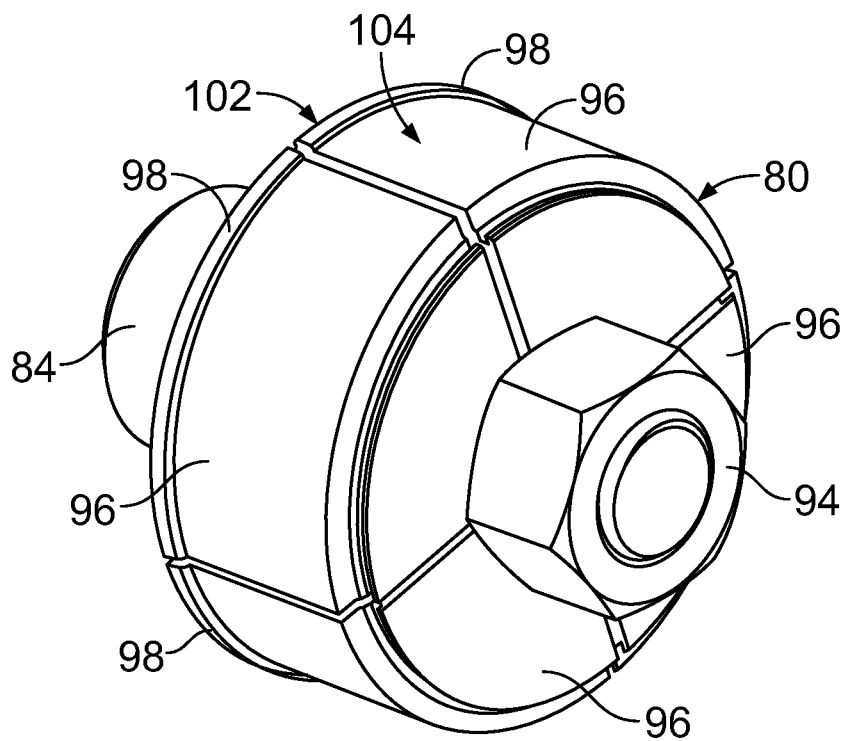

FIG. 8 is a tool head 80 configured to engage the notch 53 of the sleeve 33 when positioned as shown in FIG. 5. The tool head 80 may include four separate tool parts 96 arranged about the mandrel 84. A fastener 94 is engaged to the mandrel 84 and retains, in part, the tool parts 96 against the mandrel. Each of the tool parts 96 includes a catch 98 located at a trailing edge 102 thereof that extends radially outwardly from a tool part body 104. Each catch 98, in this embodiment, extends about 90 degrees about the tool head because there are four tool part bodies 104. Other numbers of tool part bodies 104 are contemplated. When each catch 98 is engaged with a notch 53 of the sleeve 33, the tool part bodies 104 are sized and shaped to come into contact with the inner surface 41 of the sleeve, which stabilizes and guides the sleeve 33 while the sleeve is being extracted.

Figure 9:
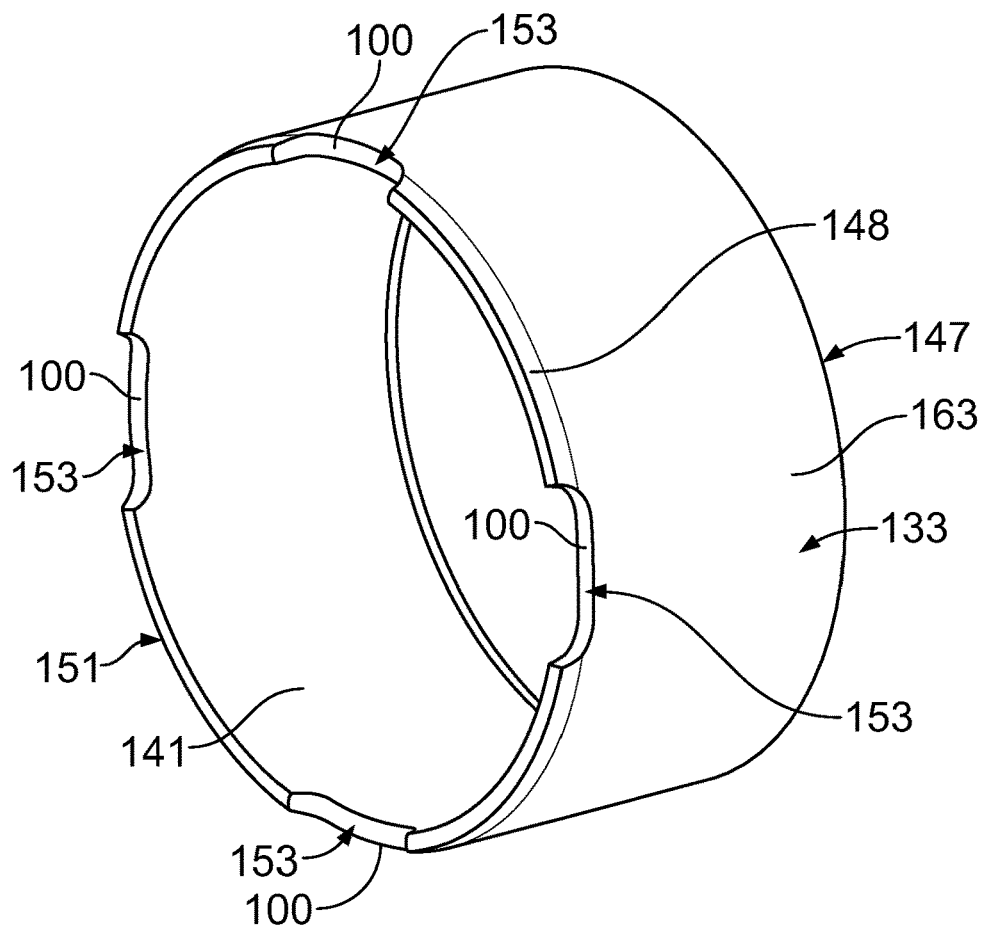
FIGS. 9 and 10 are respectively a perspective view of a second embodiment of a packing sleeve and a collet tool therefor.

FIG. 9 is an example of a sleeve 133 according to embodiments. The sleeve 133 is generally cylindrical and hollow and includes an outer surface 163 with a bevel 149 formed at the inner end 151. The sleeve 133 includes a plurality of spaced apart notches 153 formed in the inner end 151. Each of the notches 153 includes a face 100 that is normal to axis 62 when installed in the bore 60 of the fluid end block 18 (FIG. 2).

Figure 10:
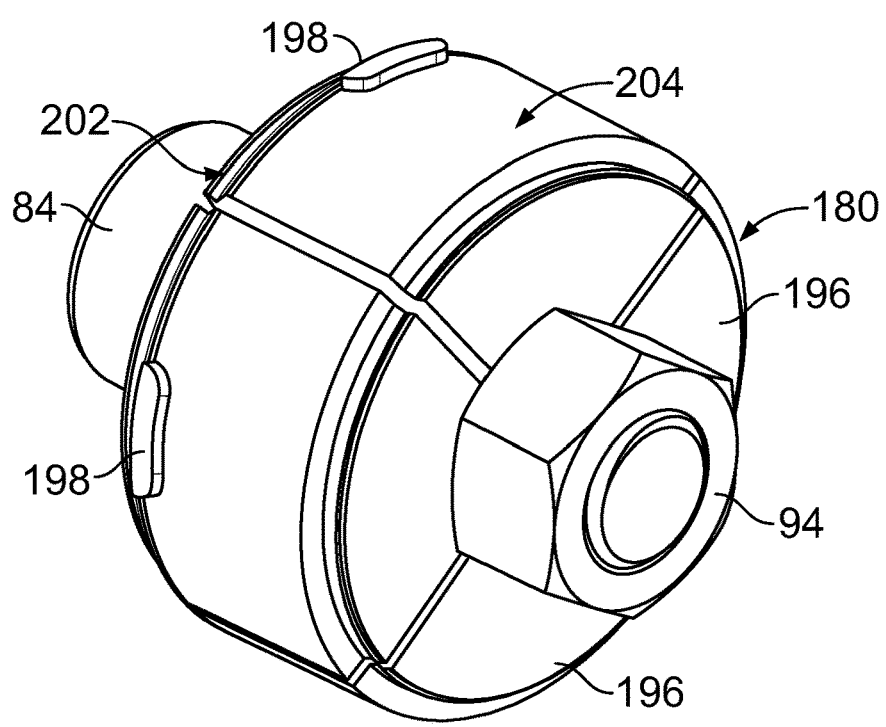

FIG. 10 is a tool head 180 configured to engage the notches 153 of the sleeve 133 when positioned as shown in FIG. 5. The tool head 180 may include separate tool parts 196 arranged about the mandrel 84. A fastener 94 is engaged to the mandrel 84 and retains, in part, the tool parts 196 against the mandrel. Each of the tool parts 196 includes a catch 198 located at a trailing edge 202 thereof that extends radially outwardly from a tool part body 204. Each catch 198, in this embodiment, is shaped and sized to fit within a respective one of the notches 153. When each catch 198 is engaged with a respective of the notches 153 of the sleeve 133, the tool part bodies 204 are sized and shaped to come into contact with the inner surface 141 of the sleeve, which stabilizes and guides the sleeve 133 while the sleeve is being extracted. It will be understood that the tool head 180 may include a separate catch 198 for each of the notches 153. One example of a sleeve 133 has four notches 153 and therefore there may be four catches 198 on the tool head 180. Other numbers of notches 153 that correspond to numbers of catches 198 are contemplated.

Figure 11:
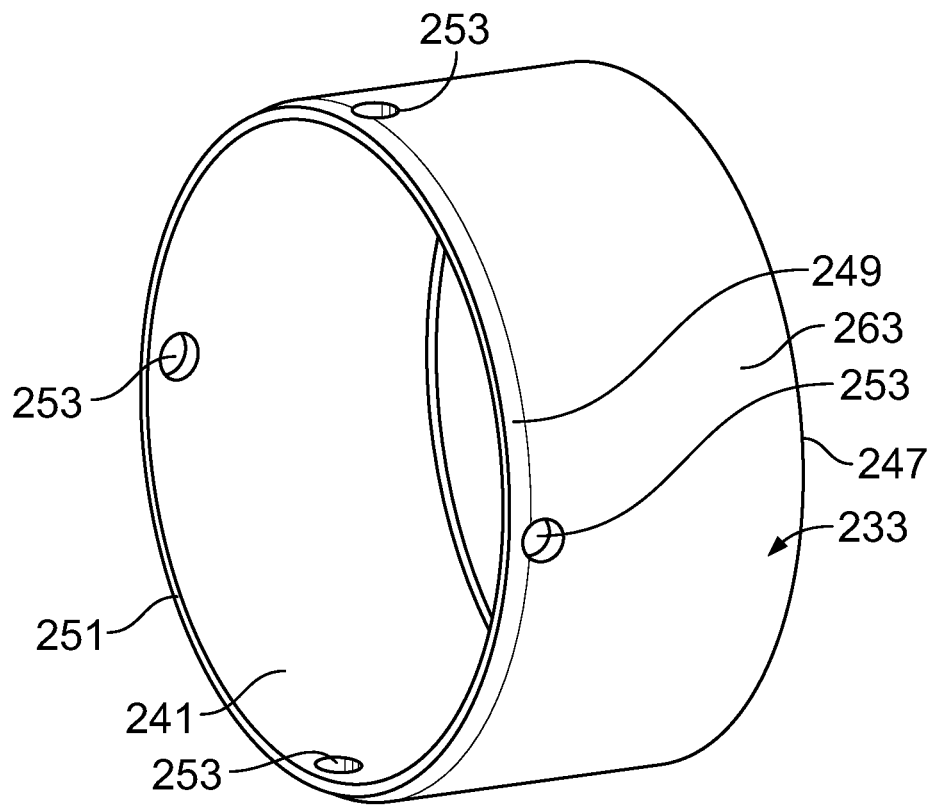
FIGS. 11 and 12 are respectively a perspective view of a third embodiment of a packing sleeve and a collet tool therefor.

FIG. 11 is an example of a sleeve 233 according to embodiments. The sleeve 233 is generally cylindrical and hollow and includes an outer surface 263 with a bevel 249 formed at the inner end 251. The sleeve 233 includes a plurality of spaced apart notches 253 formed near the inner end 251. In this embodiment, each of the notches 253 is a hole formed through the sleeve 233.

Figure 12:
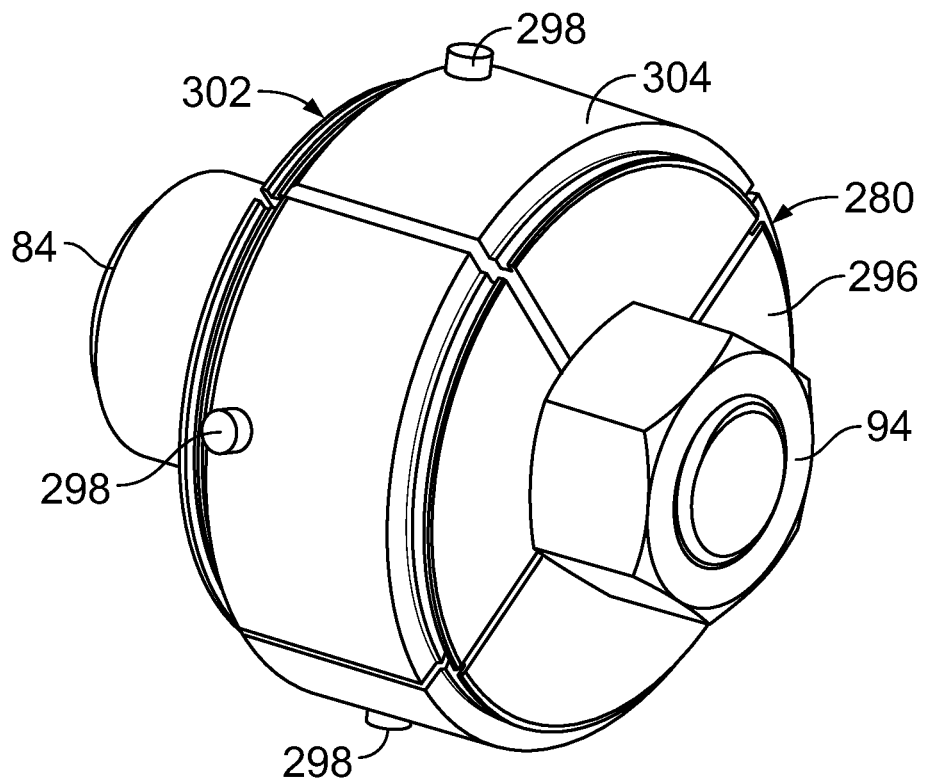

FIG. 12 is a tool head 280 configured to engage the notches 253 of the sleeve 233 when positioned as shown in FIG. 5. The tool head 280 may include separate tool parts 296 arranged about the mandrel 84. A fastener 94 is engaged to the mandrel 84 and retains, in part, the tool parts 296 against the mandrel. Each of the tool parts 296 includes a catch 298 located near a trailing edge 302 thereof that extends radially outwardly from a tool part body 304. Each catch 298, in this embodiment, is post or pin shaped and is sized to fit within a respective one of the notches 253. When each catch 298 is engaged with a respective of the notches 253 of the sleeve 233, the tool part bodies 304 are sized and shaped to come into contact with the inner surface 241 of the sleeve, which stabilizes and guides the sleeve 233 while being extracted. It will be understood that the tool head 280 may include a separate catch 298 for each of the notches 253. One example of a sleeve 233 has four circular notches 253 and therefore there may be four catches 298 on the tool head 280.

INDUSTRIAL APPLICABILITY

The industrial applicability of the system described herein will be readily appreciated from the forgoing discussion. The foregoing discussion is applicable to fluid ends of reciprocating pump assemblies, in particular, for pumping fluid media in fracturing operations and similar applications.

Figure 13:
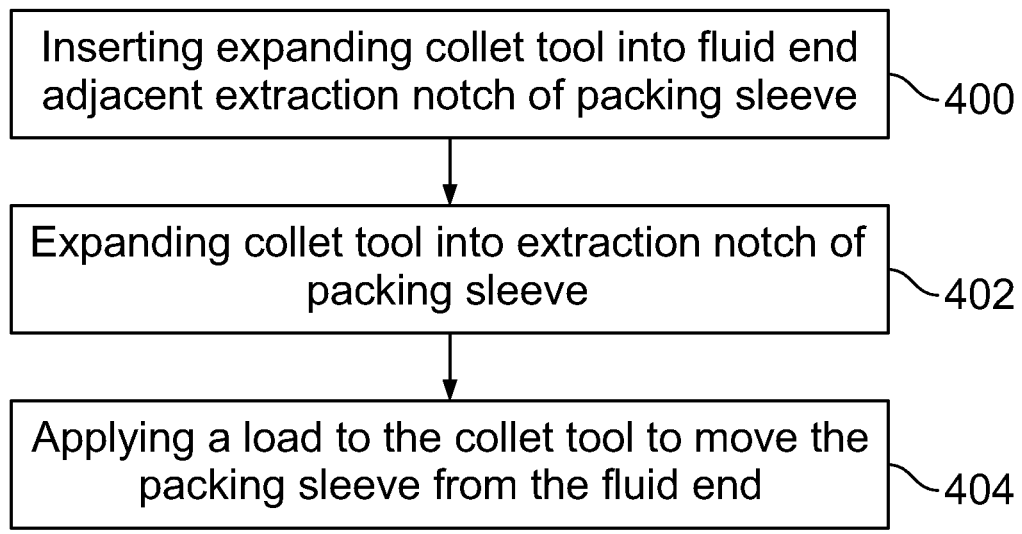
FIG. 13 is a flowchart of a method of removing a packing sleeve according to embodiments.

One example of applicability of embodiments of the disclosure are set out in FIG. 13, which summarizes a method of extracting a packing sleeve 33 from a fluid end portion 14 of a pumping system. Prior to removal of a sleeve, the fluid end portion 14 must be prepared for the process by removing the plunger 32 and the hardware across the chamber 36 from the plunger, namely the nut 26 and plug 68. Referring to the previous figures, at step 400, an illustrative method includes inserting an expanding collet tool 80 into a fluid end portion 14 of a pumping system 10. The tool 80, attached to rod 86 which itself is operatively connected to a piston 90, or an equivalent thereof, of an actuator 92, is positioned inside and adjacent the packing sleeve. At step 402, the tool 80 is expanded so as to engage, with one or more catches 102, one or more extraction notches 53 formed in the sleeve 33. The tool 80 may be expanded by tightening a nut 94 which traps the tool against a tapered mandrel 84 installed on the rod 86. A load, in step 404, is applied to the tool 80 by operation of the actuator 92, which moves the sleeve 33 from the fluid end 18, in the outboard direction as best shown in FIG. 5.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A fluid end for a reciprocating pump system, comprising: a fluid end block defining a fluid chamber and a packing bore; an outlet fluid passage formed in the fluid end block in fluid communication with the fluid chamber, the outlet fluid passage including an outlet valve; an inlet fluid passage formed in the fluid end block in fluid communication with the fluid chamber, the inlet fluid passage including an inlet valve; a plunger reciprocally disposed in the packing bore of the fluid chamber to generate fluid pressure therewithin; packing disposed in the packing bore positioned to contact the plunger; and a packing sleeve disposed between the packing and the packing bore, the packing sleeve being configured as a hollow cylinder, the hollow cylinder including: an inner surface, an outer surface opposite the inner surface, an inner end configured to be inserted first into the packing bore, and an outer end, the inner surface including a notch formed therein adjacent the inner end, and the inner end and the notch being in closer proximity to the fluid chamber than the outer end.

2. The fluid end of claim 1, wherein the packing sleeve is of single-piece construction.

3. The fluid end of claim 1, wherein the notch extends to the inner end.

4. The fluid end of claim 1, wherein the notch includes an inwardly facing radial face.

5. The fluid end of claim 1, wherein the notch is annular and extends an entire distance about an inner periphery of the inner surface.

6. The fluid end of claim 1,
wherein the inner surface includes a plurality of notches, and
wherein the plurality of notches include the notch.

7. The fluid end of claim 6, wherein the plurality of notches are formed in the inner end.

8. The fluid end of claim 6, wherein the plurality of notches are holes formed through the hollow cylinder.

9. A method of removing a packing sleeve from a packing bore of a fluid end block of a reciprocating pump system, the method comprising: positioning a tool inside the packing sleeve, wherein the tool is an expanding collet tool; expanding the tool inside the packing sleeve; engaging, with the tool, one or more notches of the packing sleeve; and applying, via an actuator, a load to the tool and to the one or more notches in a direction to force the packing sleeve out of the packing bore and out of the fluid end block.

10. The method of claim 9, wherein the one or more notches are formed in the packing sleeve at or near an inner end of the packing sleeve.

\* \* \* \* \*